(12) United States Patent
Davies

(10) Patent No.: US 10,626,235 B2
(45) Date of Patent: Apr. 21, 2020

(54) FLEXIBLE COMPOSITE PREPREG MATERIALS

(71) Applicant: Robert M Davies, Atlanta, TX (US)

(72) Inventor: Robert M Davies, Atlanta, TX (US)

( * ) Notice: Subject to any disclaimer, the term of this patent is extended or adjusted under 35 U.S.C. 154(b) by 502 days.

(21) Appl. No.: 15/345,872

(22) Filed: Nov. 8, 2016

(65) Prior Publication Data

US 2017/0051438 A1    Feb. 23, 2017

Related U.S. Application Data

(63) Continuation-in-part of application No. 14/619,805, filed on Feb. 11, 2015, now abandoned.

(60) Provisional application No. 62/318,446, filed on Apr. 5, 2016, provisional application No. 62/252,806, filed on Nov. 9, 2015, provisional application No. 61/938,211, filed on Feb. 11, 2014.

(51) Int. Cl.
*C08J 5/24*        (2006.01)
*C08J 5/04*        (2006.01)

(52) U.S. Cl.
CPC .. *C08J 5/24* (2013.01); *C08J 5/04* (2013.01)

(58) Field of Classification Search
CPC . B29B 15/12; B29B 15/122; Y10T 428/2933; Y10T 428/2396; Y10T 428/2938; Y10T 428/2967; Y10T 442/2926; Y10T 428/2936; C08J 5/04; C08J 5/24; Y10S 428/902
USPC ......... 428/375, 378, 394, 377, 902; 442/172
See application file for complete search history.

(56) References Cited

U.S. PATENT DOCUMENTS

| | | | |
|---|---|---|---|
| 5,756,206 A * | 5/1998 | Davies | D06M 23/08 428/367 |
| 7,790,284 B2 * | 9/2010 | Davies | C08J 5/04 428/375 |

* cited by examiner

*Primary Examiner* — Camie S Thompson

(57) ABSTRACT

Disclosed is a flexible composite prepreg material. The prepreg material includes a fiber bundle of fiber tows having a predetermined cross-sectional shape, wherein exterior surface fibers of said fiber bundle have a thin, irregular sheath of matrix resin on and around said exterior surface fibers of said fiber bundle, wherein substantial number interior fibers filaments remain uncoated by the matrix resin, with discreet areas of through the thickness resin bridges made of the matrix resin.

13 Claims, 5 Drawing Sheets

FLEXIBLE COMPOSITE PREPREG MATERIALS

FIELD OF THE DISCLOSURE

The present invention relates to pre-impregnated towpregs or prepregs and, more particularly, to prepregs having low bulk and low bending rigidity.

BACKGROUND

Pre-impregnated towpregs or prepregs, comprising fibers combined with a matrix resin are one form of prepreg. Conventional prepreg consists of hundreds or thousands of fibers embedded in a continuous mass of matrix resin. Reinforcing fibers may include one or more of glass fibers, carbon fibers, or many other types. The reinforcing fibers typically used are available commercially in continuous form in bundles known as tows, which vary widely in number of fibers per tow. Many matrix resins are available; however, two kinds of matrix resin systems dominate the prior art: thermoplastic and thermoset polymers.

Thermoplastic polymers have advantages over thermosetting materials in fracture toughness, impact strength and environmental resistance. Thermoplastics also provide prepregs with indefinite shelf life, give the fabricator better quality assurance and avoid the storage and refrigeration problems associated with thermosetting prepreg. The disadvantage of thermoplastic polymers as a matrix material is the difficulty of uniformly coating the fibers due to the high viscosity of the molten polymer. Thermoplastic prepregs also typically are rigid and less well suited for weaving or braiding and the resulting fabrics are stiff. Similarly, the rigidity of thermoplastic impregnated prepregs complicates the formation of complex shapes; heat must be focused at the point of contact to achieve conformability during layup.

On the other hand, prepregs containing thermosetting pre-polymers, although relatively flexible, may be tacky, thus requiring a protective release coating, typically a release paper or film, which must be removed prior to use. While thermoset prepregs are acceptable for many applications, their tackiness and the requirement of a protective release coating have made thermoset prepregs unfeasible for weaving and braiding.

Continuous fiber prepregs can be produced by a number of impregnation methods including hot melt, solution, emulsion, slurry, surface polymerization, fiber comingling, film interleaving, electroplating, and dry powder techniques.

In hot melt processing, impregnation can be accomplished by forcing the fiber and resin through a die at high temperature under conditions that create high shear rates. This process completely encapsulates substantially all the fibers making the prepreg very stiff and brittle. Other disadvantages of this process include the high stress applied to the fibers and difficulties in impregnating the fiber tows with thermoplastics, leading to low processing speeds.

In solution coating, the matrix material is dissolved in solvent and the fiber is passed through this solution and then dried to evaporate the solvent. Two disadvantages of this process are that thermoplastics usually exhibit limited solubility at high concentration, and most engineering thermoplastics cannot be dissolved in a low boiling solvent at room temperature. Additionally, high solution viscosity results in the same impregnation problems as with hot melt, as well as causing the fibers to stick together. Another problem is the difficulty in removing the solvent. Further, traces of solvent left in the prepreg lead to undesirable porosity in the composite structures.

An emulsion process is one way to apply particulate polymer matrix material with a very small particle size to prepreg fiber by synthesizing the resin as an aqueous emulsion with a surfactant. The problem with this process is that the removal of the surfactant from the final prepreg is difficult.

Slurry coating or wet powder processing is a non-solvent coating technique designed to resolve the problem of the insolubility of most thermoplastics in a solvent at room temperature. In slurry coating, the powder is suspended in a liquid medium, wherein no solvency exists between the resin and the medium, and the fibers are drawn through the slurry. The slurry with particulate matrix does not substantially wet out the fiber, resulting in the need for higher pressures to consolidate the matrix and fibers into a prepreg. This prepreg can be tacky, which is not suitable for weaving or braiding. Other disadvantages include the necessity for the removal of the liquid medium, volatiles, and dispersants or surfactants, which are used to form the polymer/liquid colloidal state, the likelihood of aggregates in the slurry caused by poor mixing, and the possibility that polymer particles will settle during processing.

To achieve intimate mixing in emulsion or slurry coating, the particulate size of the slurry or emulsion should be smaller than the fiber diameter. For many of the thermoplastics that cannot be made by emulsion or dispersion polymerization, it is extremely difficult to produce such fine powder. Thus, a coarse blend between fibers and particles is obtained. The quality of the blend decreases as the particle size increases, leading to poor matrix distribution in the consolidated prepreg, and a poor composite structure.

In fiber comingling, the polymeric matrix is introduced in fibrous form. Polymeric and reinforcing fibers are mingled as dry blends. Effective impregnation depends on the degree of randomness of the intermingling of the resin and fiber throughout the system. Since no wetting of the reinforcing fibers by the matrix material occurs, higher pressures are needed to consolidate the prepreg under equivalent processing times and temperatures, as compared to completely wetted prepregs. Another disadvantage of comingling products is its higher bulk factor making it more difficult to fit in complex molds.

Film casting is one method for producing prepreg, which resolves some of the problems associated with hot melt impregnation of thermoplastics. It consists of stacking a film layer of matrix material cast from either hot melt or solution over the prepreg fibers. The fibers sandwiched between two films are heated and calendared to force the resin into the fibers. The resulting prepreg is a rigid sheet that is difficult to form into complex shapes without elaborate thermoforming techniques.

Powder coating of fibers coats the tows with a powdered resin using a dry electrostatic process and fusing the resin to the tow with high-powered infrared ovens. The powdered resin must be solid at ambient and elevated storage temperatures, and be capable of melting to permit flow and to penetrate the fiber tow when heated. Dry powder coating has a disadvantage of precise metered resin control. Another disadvantage of powder coating is shedding of resin from the tow before the high temperature fusing, making a poor quality prepreg. Another disadvantage is the resin must be ground into powder of specific size for optimum coating. The grinding process is expensive and makes this process more expensive.

Intermediate composite products, such as prepreg, must contain sufficient matrix, typically over 15% by volume, to permit consolidation of the components into a substantially void-free prepreg structure without requiring the incorporation of more matrix material. Linear prepregs can be converted into two and three dimensional product forms by weaving, braiding, filament winding, and other known processes. Alternatively, these prepregs can be used to create a discontinuous fiber reinforced feedstock for molding by chopping, cutting, or like known processes.

Prepreg can be converted to a preform of a predetermined shape and fiber orientation. Preforms can be produced by any one of the conventional textile preform making methods, such as weaving, braiding and knitting, or by processes such as filament winding and tape or tow placement. Preforms ultimately or concurrently can be consolidated into composite parts by applying heat and pressure.

A powder coating process, such as the one disclosed in U.S. Pat. No. 5,756,206 to Davies et al. typically involves the following four steps:

Forming un-spread tow in various cross sections;
Coating un-spread tow with resin particles;
Partially melting the particles onto the surface of the un-spread tow; and
Taking up resulting towpreg onto bobbins.

During the melting process the resin particles, which are placed on the surface of a fiber bundle, melt in discontinuous patches along the fibers, the only penetration of the fiber bundles is by capillary action and is minimal. The discontinuous patches portions of the underlying fiber to be exposed. This feature provides the reduced rigidity but exposes the fiber to damaging textile processes. The lumpy surface also increases bulk, which requires deeper cavities than molds with lower bulk. The deeper cavity molds have more mass and require more heat input to reach melting temperatures of the matrix resin. This slows the process and takes longer to make finished articles. The lumpy surface can catch on fiber guide in a weaving, braiding operation, or any operation using the towpreg that requires pulling the tow through alignment guides or adjacent fibers to place the tow. The catching action can damage the towpreg or strip the resin from the surface of the tow. The damaged tow and missing resin areas of the resulting preform would produce an inferior composite article.

An extrusion coating towpreg forming process such as U.S. Pat. No. 7,790,284 follows four steps:

Forming un-spread tow in various cross sections;
Coating melted resin onto the surface of the un-spread tow; and
Taking up resulting towpreg onto bobbins.

This process forms a uniform continuous thermoplastic prepreg generally in a ribbon like cross section. The fiber bundles are tightly packed together to form a low bulk prepreg. The extrusion coated resin forms a sleeve over the fiber tow being coated. The sleeve generally remains flat in narrow prepreg tows but in wider prepreg tows, it can wrinkle or balloon outward during bending. The wrinkling increases the overall bulk of a composite preform. The uncoated filaments rely on the flow of resin from the surface layer for complete consolidation during molding.

Therefore, there is a need for a relatively low bulk and flexible prepreg with a means to control the shape of towpreg including wide towpreg tapes, which make the wetting of the fiber bundles during consolidation faster, more efficient and more consistent.

SUMMARY

The present disclosure generally relates to a flexible composite pre-impregnated towpreg or prepreg material formed by the conversion of high performance fiber tows into a predetermined cross-sectional form by one of a plurality of different methods such as low pressure impregnation of the tow with molten resin, partially adhering onto and around the exterior fibers of the fiber bundle such that a substantial number interior fibers filaments remain uncoated, with discreet areas of through the thickness resin bridges and a thin, irregular sheath of resin is created on and around the exterior of the fiber bundle. The resulting prepreg may be wound onto take-up bobbins for downstream composite processes used in the production of composite structures.

The resulting flexible prepreg then may be converted into preforms for composite applications through one of many conventional textile processes, or by tape laying or filament winding. The preforms may be ultimately converted into composite parts by applying heat and pressure, consolidating the fiber and resin into a homogeneous item.

The resultant flexible prepreg may be formed by coating fiber tows formed in various cross-sectional configurations with a matrix resin, wherein the tows may be arranged in a predetermined cross-sectional shape, such as flat ribbon form, ellipses, rectangles and circular. The reshaping of the cross-section of the tow may be obtained by passing the tow through an orifice, which is part of a low pressure impregnating apparatus. During the low pressure impregnating process, random gaps in the fiber bundle may be created with a substantial portion of the filaments grouped in bundles, the resin melt fills the random gaps in the bundle yet may not penetrate deeply into the grouped portion of the filament bundle, but rather may coat only a few fibers on the surface of the bundles. This results in dry internal fibers in the core of the prepreg and an irregular sheath of substantially coated external fibers with random areas of resin bridges between the surfaces, stabilizing the towpreg.

The external portion of the fiber bundle may be mostly coated on the surface of the prepreg; however, the resin coating may be generally an irregular thickness yet more or less uniformly distributed along the entire surface of the fiber bundle, with the resulting thin cross-section having decreased bending rigidity. The random and discreet resin bridges between the outer surfaces may serve to maintain the prepreg tow shape and promote fast wetting of the uncoated filaments during the formation of composite structures. The combination of the irregularly coated surface fibers, the discreet areas or resin bridges and dry core filaments may result in a prepreg with relatively low bulk and low bending rigidity in comparison to prepregs produced with the existing methods.

Accordingly, it is a primary object of the present disclosure to provide flexible prepregs with the least possible bulk using high performance fibers such as carbon, aramids, glass fibers, metal fibers, ceramic fibers, organic fibers, and the like, and resin materials including both thermoset and thermoplastic resins.

It is another object of the present disclosure to provide low bulk, flexible prepregs having at least 15% resin by volume when considering the total of the fully consolidated composite, thereby permitting consolidation of the components into a substantially void-free composite structures.

It is another object of the present disclosure to provide low-bulk, flexible prepregs wherein the resin may be uniformly distributed across and along the exterior fibers of the tow, so that with application of pressure and temperature, the resin may be able to melt and flow between the fibers of the fiber bundle to result in a uniform degree of wet out of the fibers when forming a composite article.

It is yet another object of the present disclosure to provide low bulk, flexible prepregs, which may allow for the maximum number of fibers of the fiber bundle to be covered with the resin material without increasing the bulk or rigidity of the prepreg.

It is yet another object of the present disclosure to provide low bulk, flexible prepregs that may propose partial impregnation, as opposed to complete impregnation of the resin to achieve adhesion of the resin to the fibers.

Another object of the present disclosure is to provide a prepreg comprising a bundle of fibers, the interior fibers remaining free of matrix forming resin and the exterior fibers impregnated with resin partially adhering onto and around the fibers on the exterior of the bundle.

Another object of the present disclosure is to provide a prepreg comprising a fiber bundle, the interior fibers remaining substantially free of matrix forming resin, the exterior fibers impregnated with resin partially adhering onto and around the fibers on the exterior of the bundle and discreet matrix resin bridges tying the outer surfaces together.

It is yet another object of the present disclosure to provide low bulk, flexible prepregs, which may be suitable for processing various types of commercially available fibers and resin materials in a cost efficient manner.

It is yet another object of the present disclosure to provide a means to reshape the width, profile or the surface after exiting the coating device.

It is yet another object of the present disclosure to provide low bulk, flexible prepregs, which may be suitable for processing various types of resin with additives and fillers. Additives may provide for fire resistance, ultra violet light protection, or colors to name a few. Fillers may provide improved interlaminate shear properties, improved through the thickness thermal conductivity, or increased hardness to name a few.

These objects and other objects, features and advantages of the present disclosure will become apparent from the following discussion when read in conjunction with the attached drawings, in which like reference numerals correspond to like components throughout the several views.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary.

The present disclosure relates to pre-impregnated towpregs or prepregs and, more particularly, to prepregs having low bulk and low bending rigidity, which utilizes low pressure impregnation or a similar coating process that involves the conversion of high-performance fiber bundles known as tows in the industry into a pre-selected cross-sectional form, such as flat ribbon form, coating the outer fibers of the tow form with a resin while leaving the interior fibers of the tow form substantially uncoated with discrete areas of complete penetration of the resin, partially fusing the resin onto the tow to create an irregularly bonded sheath of resin about the tow, and winding the resulting flexible low bulk prepreg onto take-up bobbins. The flexible low bulk prepreg may be converted into textile preforms such as fabrics which, with the addition of heat and pressure, may make high strength, lightweight composite structures.

Reducing the bulk of the prepreg without sacrificing the flexibility and other properties of the prepreg is an important advantage of the present disclosure. This is accomplished by suitably modifying the fiber architecture of the tow before coating the fibers with resin material.

Figure 1:
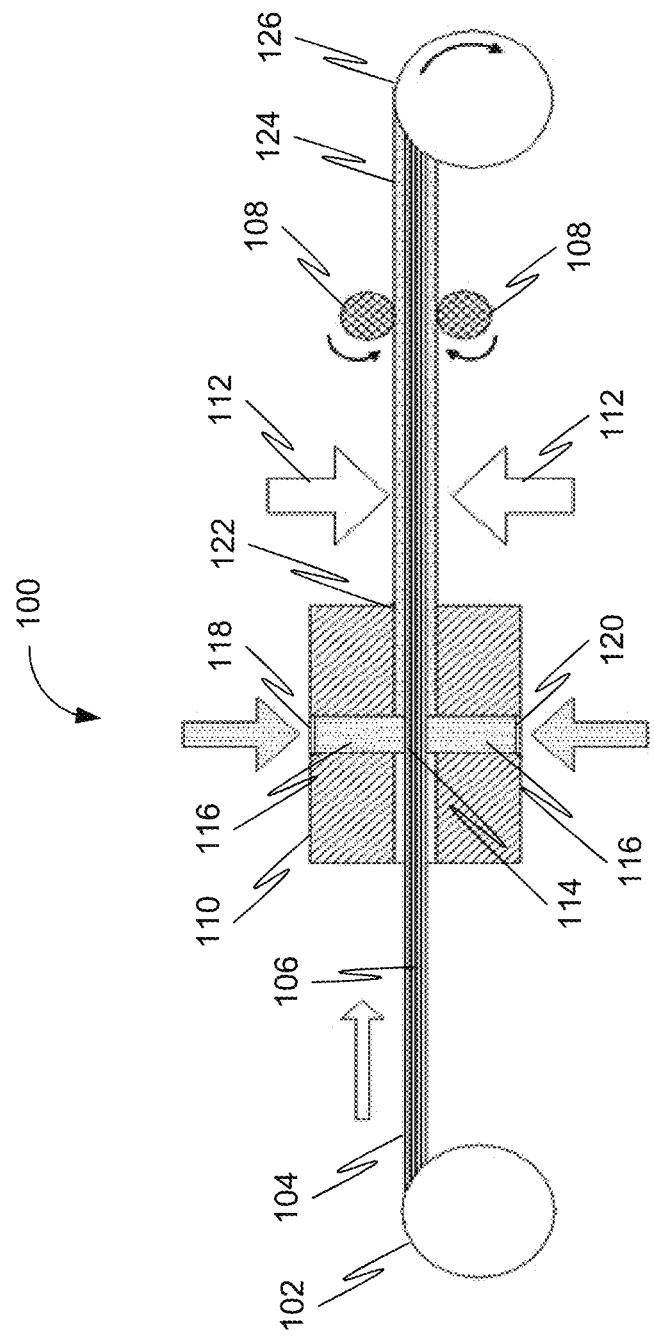
FIG. 1 is a schematic of an apparatus for forming a flexible composite prepreg material in accordance with some embodiments of the disclosure.

Referring to FIG. 1, an apparatus 100 for forming a flexible composite prepreg material in accordance with some embodiments of the disclosure is shown. The apparatus 100 may include a supply package 102 of a tow (or fiber bundle) 104 comprising multiple fibers 106. The apparatus 100 may further include a pulling system 108 to pull the tow 104 from the supply package 102 through a coating device 110 and a cooling device 112. The pulling system 108 may include one or more of a nip roll and a belt puller.

The tow 104 may include one or more of, but not limited to, a glass fiber, a carbon fiber, an aramid fiber, a high modulus polyethylene fiber, a quartz fiber, a ceramic fiber, a boron fiber, a basalt fiber, a steel fiber, a aluminum fiber, a stainless steel fiber, a flax fiber, a hemp fiber, a jute fiber, a kenaf fiber, a sisal, and a bamboo fiber. The multiple fibers 106 may be one of continuous fibers and discontinuous fibers such as stretch broken or spun fibers.

Further, the supply package 102 may be a creel device, such that the tow 104 may be pulled from the creel device with little or no tension control. However, it is required that the tow 104 unrolls freely so as not to effect the coating process or to cause damage to the multiple fibers 106. Therefore, the apparatus 100 may further include a tensioning device employed close to the entrance of the coating device 110, wherein the tensioning device is configured to supply the tow 104 to the coating device 110 in a uniform format and at a tension that packs the multiple fibers 106 closely with discreet separations for resin bridges before entering in a resin melt zone 114 in the coating device 110. The resin melt zone 114 may minimize the exposure of a resin 116 to the multiple fibers 106 during the production process of the tow 104.

Thermoplastic resin may be preferred to be used as matrix resin because the impact strength of the molded products made from them are good and the molded products may be made by any molding process such as hot press molding. The preferred thermoplastic resin 116 may include one or more of, but not limited to, polyamide (PA); polyesters such as polyethylene terephthalate (PET), polybutylene terephthalate (PBT), polyphenylenesulfide (PPS), polytrimethylene terephthalate (PTT), polyetherketone (PEK), polyetheretherketone (PEEK), polyetherketoneketone (PEKK), polyarylate polyethylene (PE), polypropylene (PP), Acrylonitrile butadiene styrene (ABS); polyoxymethylene (POM), polycarbonate (PC), polymethylenemethacrylate (PMMA), polyvinyl chloride (PVC), polyphenylene ether (PPE); polyimide (PI), polyamideimide (PAI), polyetherimide (PEI), polysulfone (PSU), and polyethersulfone; polyketone (PK).

First, the resin plasticating may be performed with a device that melts resin thoroughly and delivers the molten resin 116 to the coating device 110 at a pressure higher than the desired coating and impregnation pressure. For example, the plasticating pressure range may be 5-140 bar. The coating device 110 may be designed to provide a pressure drop area with a pressure range of between 0.0 and 6.9 bar, preferably between 0.3 and 1.4 bar.

The tow 104 is pulled through the coating device 110 by the pulling system 108. The coating device 110 may be configured to thinly distribute the molten resin 116 onto the multiple fibers 106 of the tow 104 at a low pressure and at the same time filling the resin bridges. The coating device 110 may include multiple apertures 118-120 through which the molten resin 116 may flow at a low pressure before engaging the tow 104 as it passes by at a predetermined line speed. The reduced residence time combined with resin pressure between 0.0 and 6.9 bar and preferably between 0.3 and 1.4 bar, provides a means of applying precise partial impregnation the tow 104.

The coating device 110 may also include a forming die 122 at exit wall of the coating device 110. The exit wall of the coating device 110 may be nearly perpendicular to the tow path so as not to drag additional resin through the forming die 122. The forming die 122 may be configured to shape the tow 104 and provide shearing along the surface of the coated tow 104, wherein the shearing action removes excess resin and promotes an irregular surface as the tow 104 exits the coating device 110. Shaping the tow 104 includes modifying one or more of a width, a profile and a surface of the tow 104 after exiting the coating device 110.

Once the tow 104 emerges from the coating device, the tow 104 may be cooled by passing the tow 104 through the cooling system 112. The cooling system 112 may include one or more of forcing air from a ducted fan on the tow 104 and using chilled rolls onto which the tow 104 may be placed.

The pulling system 108 may pull the tow 104 through the apparatus 100 at a controlled rate before winding a resultant prepreg material 124 onto a take-up package 126. For example, the impregnation line speed may vary from 10 to 300 meters per minute. The take-up package 126 may include a spool, such that a conventional textile winding machine may wound the resultant prepreg material 124 onto a take-up package 126.

In accordance with the present disclosure, the spreading process used in conventional extrusion coating is eliminated. Further, a uniform coating of resin on the fiber tow exterior may be obtained by suitably modifying the tow architecture before coating the tows.

Figure 2:
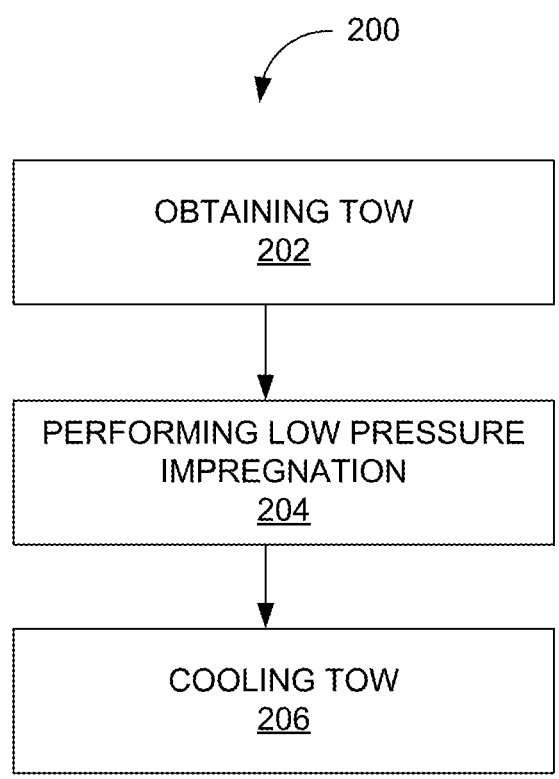
FIG. 2 is a flowchart of a method for forming flexible composite prepreg material in accordance with some embodiments of the disclosure.

Referring to FIG. 2, a flowchart illustrating a method 200 for forming the flexible composite prepreg material 124. At 202, the method 200 includes obtaining the tow 104 comprising the multiple fibers 106. Thereafter, the pulling system 108 pulling the tow 104 into the coating device 110 for performing low pressure impregnation of the tow with a molten resin at 204. The molten resin partially adhering onto and circumferentially around exterior fibers of the tow 104 having a predetermined cross-sectional shape, wherein exterior surface fibers of said tow 104 having a thin, irregular sheath of the resin on and around said exterior surface fibers of said tow, wherein substantial number interior fibers filaments remain uncoated by the resin, with discreet areas of through the thickness resin bridges made of the resin.

Next, at 206, the method 200 may include cooling the tow 104 coated with the resin using the cooling device 112 to obtain the resultant prepreg material 124.

The method 200 may further include reshaping the tow 104 after low pressure impregnation is complete using the forming die 122. The reshaping may include modifying one or more of a width, a profile and a surface of the tow 104.

The method 200 may further include converting the resulting prepreg 124 into preforms for composite applications through one of conventional textile processes, tape laying and filament winding, wherein the preforms are converted into composite parts by applying heat and pressure, consolidating the fiber and resin into a homogeneous item.

Figure 3:
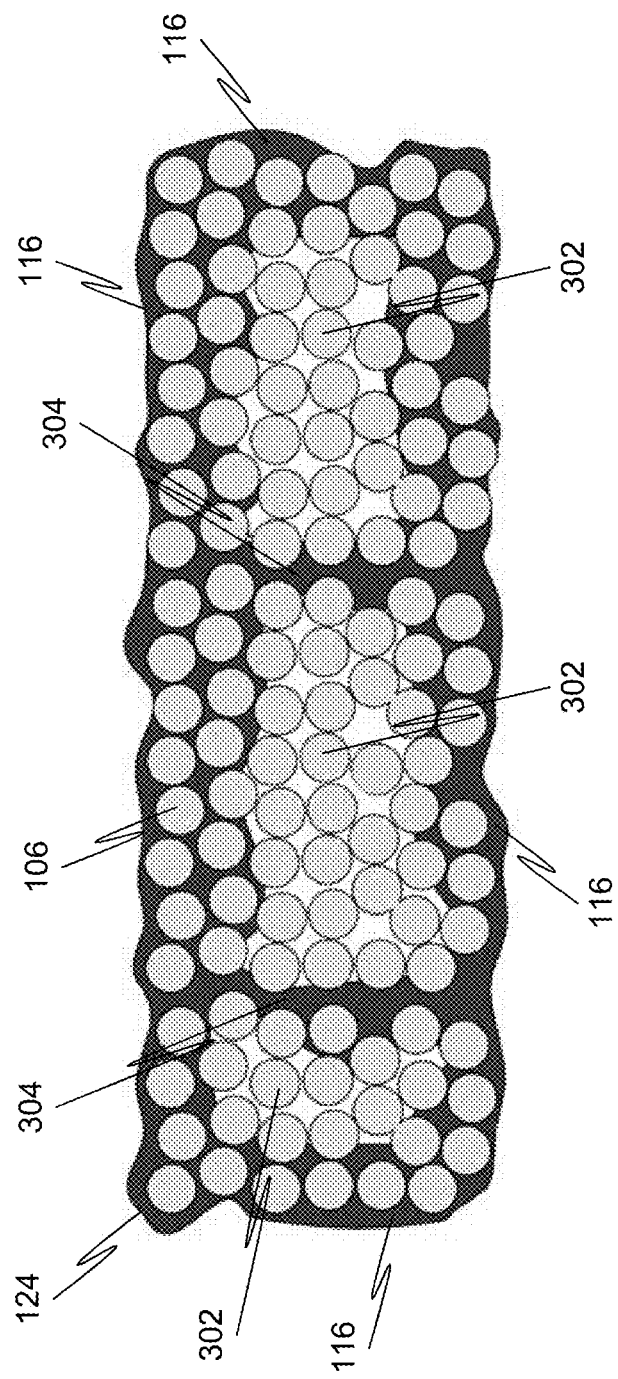
FIG. 3 is a schematic of a cross-section of a resultant prepreg material in accordance with some embodiments of the disclosure.

Referring to FIG. 3, a schematic of a cross-section of the resultant prepreg material 124 (the tow 104) is shown according to some embodiments. The resultant prepreg material 124 includes multiple fibers 106. A thin, irregular sheath of resin 116 is created on and around the exterior layers of the material 124. A substantial number interior fibers 302 remain uncoated. For example, 5-70%, preferably 33%, of the interior fibers 302 may remain uncoated. Further, the resultant prepreg material 124 includes discreet areas of through the thickness resin bridges 304.

Figure 4:
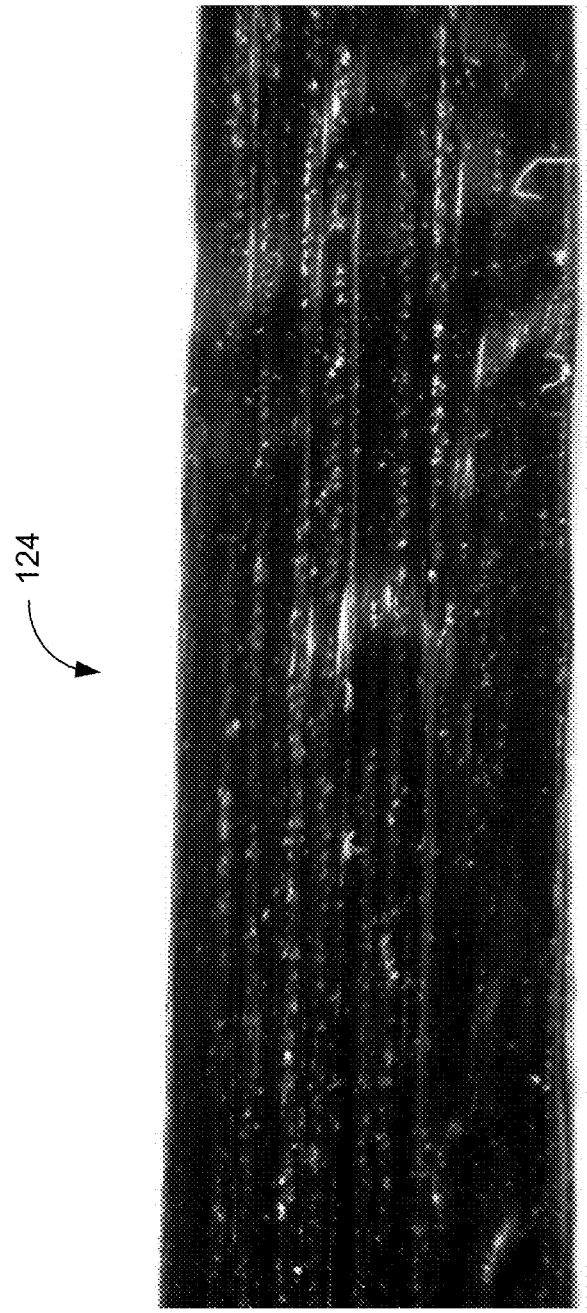
FIG. 4 is a photomicrograph of a portion of the resultant prepreg material in accordance with some embodiments of the disclosure.

FIG. 4 is a photomicrograph of a portion of the resultant prepreg material 124. For example, the tow shown may be 5.6 mm wide.

Figure 5:
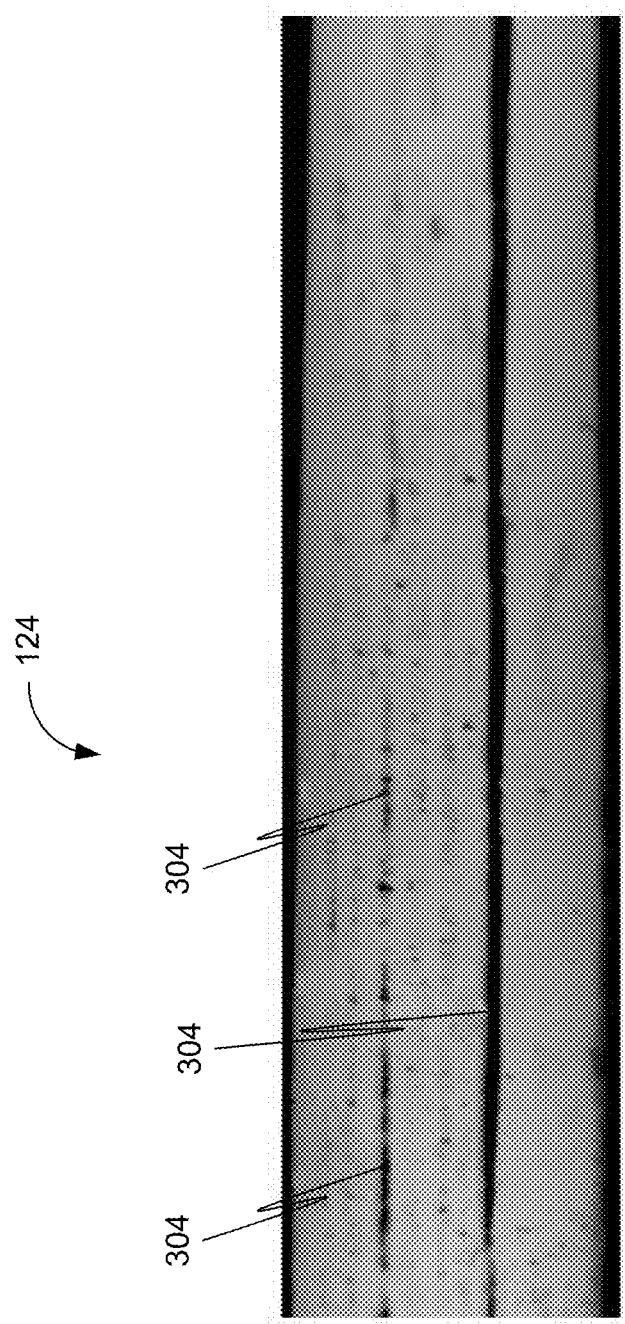
FIG. 5 is a negative image photomicrograph of a portion of the resultant prepreg material taken with back lighting in accordance with some embodiments of the disclosure.

FIG. 5 is a negative image photomicrograph of a portion of the resultant prepreg material 124 taken with back lighting. The resin bridges 304 are shown as the dark streaks. The discreet and random characteristic is clearly depicted in this image.

Although the present invention has been described with reference to particular embodiments, it will be apparent to those skilled in the art that modifications to the method, materials, dimensions and conditions discussed above may be made which are in keeping with the spirit and scope of the present invention.

We claim:

1. A flexible composite prepreg material comprising a fiber bundle of fiber tows having a predetermined cross-sectional shape, wherein exterior surface fibers of said fiber bundle having a thin, irregular sheath of matrix resin on and around said exterior surface fibers of said fiber bundle, wherein a substantial number of interior fiber filaments remain uncoated by the matrix resin, with discreet areas of through the thickness resin bridges made of the matrix resin, wherein the resin coating on the exterior surface has generally an irregular thickness yet it is uniformly distributed along the entire exterior surface of the fiber bundle, with the resulting thin cross-section having decreased bending rigidity, wherein the resin bridges are spread randomly and discreetly between the exterior surface serving to maintain the prepreg tow shape and promoting fast wetting of the uncoated filaments during the formation of composite structures, wherein a combination of the irregularly coated surface fibers, the resin bridges and dry core filaments results in a prepreg with relatively low bulk and low bending rigidity.

2. The material according to claim 1, wherein the prepreg material is formed by low pressure impregnation of the fiber tows with a molten resin, partially adhering onto and circumferentially around the exterior fibers of the fiber bundle.

3. The material according to claim 2, wherein the low pressure impregnation is performed in a pressure range between 0.0 and 6.9 bar.

4. The material according to claim 2, wherein the low pressure impregnation is performed in a pressure range between 0.3 and 1.4 bar.

5. The material according to claim 1, wherein the resulting prepreg is converted into preforms for composite applications through one of conventional textile processes, tape laying and filament winding, wherein the preforms are converted into composite parts by applying heat and pressure, consolidating the fiber and resin into a homogeneous item.

6. The material according to claim 1, wherein said matrix resin is at least one of a thermoplastic resin and a thermoset resin.

7. The material according to claim 6, wherein said thermoplastic resin is selected from the group consisting of polyamide (PA); polyesters such as polyethylene terephthalate (PET), polybutylene terephthalate (PBT), polyphenylenesulfide (PPS), polytrimethylene terephthalate (PTT), polyetherketone (PEK), polyetheretherketone (PEEK), polyetherketoneketone (PEKK), polyarylate polyethylene (PE), polypropylene (PP), Acrylonitrile butadiene styrene (ABS); polyoxymethylene (POM), polycarbonate (PC), polymethylenemethacrylate (PMMA), polyvinyl chloride (PVC), polyphenylene ether (PPE); polyimide (PI), polyamideimide (PAI), polyetherimide (PEI), polysulfone (PSU), polyethersulfone; and polyketone (PK).

8. The material according to claim 6, wherein said thermoset resin is selected from the group consisting of epoxy, phenolics, polyimides, and polyurethane.

9. The material according to claim 1, wherein said predetermined cross-sectional shape comprises at least one of a flat ribbon geometry, an elliptical geometry, and a circular geometry.

10. The material according to claim 1, wherein fiber tows are selected from the group consisting of glass fiber, carbon fiber, aramid fiber, high modulus polyethylene fiber, quartz fiber, ceramic fiber, boron fiber, basalt fiber, steel fiber, aluminum fiber, stainless steel fiber, flax fiber, hemp fiber, jute fiber, kenaf fiber, sisal, and bamboo fiber.

11. The material according to claim 1, wherein said material has at least 15% by volume resin impregnated within said material.

12. The material according to claim 1, wherein 5-70% by volume of the interior fibers filaments remain uncoated.

13. The material according to claim 12, wherein 20-40% by volume of the interior fibers filaments remain uncoated.

* * * * *